United States Patent
Darga et al.

(10) Patent No.: US 9,196,909 B2
(45) Date of Patent: Nov. 24, 2015

(54) FUEL CELL INTERCONNECT HEAT TREATMENT METHOD

(71) Applicant: Bloom Energy Corporation, Sunnyvale, CA (US)

(72) Inventors: Daniel Darga, Pleasanton, CA (US); Harald Herchen, Los Altos, CA (US); Chockkalingam Karuppaiah, Cupertino, CA (US); Ravi Oswal, Fremont, CA (US); Shivanand Majagi, Rogers, AK (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 53 days.

(21) Appl. No.: 13/678,981

(22) Filed: Nov. 16, 2012

(65) Prior Publication Data

US 2013/0130154 A1    May 23, 2013

Related U.S. Application Data

(60) Provisional application No. 61/561,344, filed on Nov. 18, 2011.

(51) Int. Cl.
| | |
|---|---|
| *H01M 8/02* | (2006.01) |
| *B22F 5/10* | (2006.01) |
| *H01M 8/12* | (2006.01) |
| *C22C 1/04* | (2006.01) |

(52) U.S. Cl.
CPC ............. *H01M 8/0202* (2013.01); *B22F 5/10* (2013.01); *H01M 8/026* (2013.01); *H01M 8/0208* (2013.01); *H01M 8/0258* (2013.01); *B22F 2998/10* (2013.01); *C22C 1/04* (2013.01); *H01M 8/021* (2013.01); *H01M 8/0247* (2013.01); *H01M 2008/1293* (2013.01); *Y02E 60/50* (2013.01); *Y02E 60/525* (2013.01)

(58) Field of Classification Search
None
See application file for complete search history.

(56) References Cited

U.S. PATENT DOCUMENTS

| | | | |
|---|---|---|---|
| 4,135,041 A | 1/1979 | Jung et al. | |
| 4,755,429 A | 7/1988 | Nickols et al. | |

(Continued)

FOREIGN PATENT DOCUMENTS

| | | |
|---|---|---|
| EP | 0615299 A1 | 9/1994 |
| EP | 1098380 A1 | 5/2001 |

(Continued)

OTHER PUBLICATIONS

Haynes International High-Temperature Alloys, "Haynes (Reg.) 230(TM) alloy", 2004, pp. 1-27.

(Continued)

*Primary Examiner* — Ula C Ruddock
*Assistant Examiner* — Scott J Chmielecki
(74) *Attorney, Agent, or Firm* — The Marbury Law Group PLLC

(57) ABSTRACT

Methods for fabricating an interconnect for a fuel cell stack include placing a compressed metal powder interconnect on a porous support, and sintering the interconnect in the presence of a non-oxidizing gas. The method may further include placing the sintered interconnect on a porous support, and oxidizing the interconnect in the presence of flowing air, or placing the sintered interconnect on a dense, non-porous support, and oxidizing the interconnect in the presence of a gas comprising pure oxygen or an oxygen/inert gas mixture that is substantially nitrogen-free.

20 Claims, 17 Drawing Sheets

(56) References Cited

U.S. PATENT DOCUMENTS

| | | | |
|---|---|---|---|
| 4,913,982 | A | 4/1990 | Kotchick et al. |
| 5,162,167 | A | 11/1992 | Minh et al. |
| 5,213,910 | A | 5/1993 | Yamada |
| 5,215,946 | A | 6/1993 | Minh |
| 5,248,712 | A | 9/1993 | Takeuchi et al. |
| 5,256,499 | A | 10/1993 | Minh et al. |
| 5,273,837 | A | 12/1993 | Aitken et al. |
| 5,290,642 | A | 3/1994 | Minh et al. |
| 5,342,705 | A | 8/1994 | Minh et al. |
| 5,368,667 | A | 11/1994 | Minh et al. |
| 5,382,315 | A | 1/1995 | Kumar |
| 5,453,331 | A | 9/1995 | Bloom et al. |
| 5,476,248 | A * | 12/1995 | Kobayashi et al. ............ 266/171 |
| 5,494,700 | A | 2/1996 | Anderson et al. |
| 5,501,914 | A | 3/1996 | Satake et al. |
| 5,518,829 | A | 5/1996 | Satake et al. |
| 5,589,017 | A | 12/1996 | Minh |
| 5,641,585 | A | 6/1997 | Lessing et al. |
| 5,733,499 | A | 3/1998 | Takeuchi et al. |
| 5,733,682 | A * | 3/1998 | Quadakkers et al. ......... 429/210 |
| 5,955,392 | A | 9/1999 | Takeuchi et al. |
| 6,001,761 | A | 12/1999 | Hata et al. |
| 6,361,892 | B1 | 3/2002 | Ruhl et al. |
| 6,492,053 | B1 | 12/2002 | Donelson et al. |
| 6,582,845 | B2 | 6/2003 | Helfinstine et al. |
| 6,589,681 | B1 | 7/2003 | Yamanis |
| 6,638,575 | B1 | 10/2003 | Chen et al. |
| 6,835,488 | B2 | 12/2004 | Sasahara et al. |
| 7,045,237 | B2 | 5/2006 | Sridhar et al. |
| 8,173,063 | B2 | 5/2012 | Zobl et al. |
| 2002/0012825 | A1 | 1/2002 | Sasahara et al. |
| 2002/0132156 | A1 | 9/2002 | Ruhl et al. |
| 2003/0170527 | A1 | 9/2003 | Finn et al. |
| 2003/0180602 | A1 | 9/2003 | Finn |
| 2004/0101742 | A1 | 5/2004 | Simpkins et al. |
| 2004/0200187 | A1 | 10/2004 | Warrier et al. |
| 2005/0017055 | A1 | 1/2005 | Kurz et al. |
| 2005/0084725 | A1 | 4/2005 | Arthur et al. |
| 2005/0136312 | A1 | 6/2005 | Bourgeois et al. |
| 2005/0227134 | A1 | 10/2005 | Nguyen |
| 2006/0192323 | A1 | 8/2006 | Zobl et al. |
| 2006/0251947 | A1 * | 11/2006 | Carter et al. .................. 429/35 |
| 2007/0134532 | A1 | 6/2007 | Jacobson et al. |
| 2007/0151415 | A1 * | 7/2007 | Chun et al. ..................... 75/235 |
| 2007/0207375 | A1 | 9/2007 | Jacobson et al. |
| 2007/0231676 | A1 | 10/2007 | Cassidy et al. |
| 2008/0013257 | A1 * | 1/2008 | Seitz et al. .................... 361/504 |
| 2008/0081223 | A1 | 4/2008 | Yasumoto et al. |
| 2008/0199738 | A1 | 8/2008 | Perry et al. |
| 2009/0004547 | A1 | 1/2009 | Vitella et al. |
| 2009/0117441 | A1 | 5/2009 | Suzuki et al. |
| 2009/0162236 | A1 * | 6/2009 | Hammond et al. ............ 419/19 |
| 2009/0220833 | A1 | 9/2009 | Jones |
| 2009/0246636 | A1 * | 10/2009 | Chiang et al. ............ 429/231.95 |
| 2010/0119917 | A1 | 5/2010 | Kumar et al. |
| 2010/0233576 | A1 * | 9/2010 | Brandner et al. ............. 429/491 |
| 2010/0234200 | A1 * | 9/2010 | Kurisu ............................ 492/53 |
| 2010/0239937 | A1 | 9/2010 | Janousek et al. |
| 2011/0135531 | A1 * | 6/2011 | Hsu et al. ........................ 419/26 |
| 2011/0143261 | A1 | 6/2011 | Brandner et al. |
| 2011/0223510 | A1 | 9/2011 | Greiner et al. |
| 2011/0287340 | A1 * | 11/2011 | Mougin et al. ................ 429/514 |

FOREIGN PATENT DOCUMENTS

| | | |
|---|---|---|
| JP | 06-215778 | 8/1994 |
| JP | 09-199143 | 7/1997 |
| JP | 09-223506 | 8/1997 |
| JP | 09-245810 | 9/1997 |
| JP | 09-245811 | 9/1997 |
| JP | 09-277226 | 10/1997 |
| JP | 2000-281438 | 10/2000 |
| JP | 2010-113955 A | 5/2010 |
| WO | WO2006/016628 A1 | 2/2006 |
| WO | WO 2006/016628 A1 | 2/2006 |

OTHER PUBLICATIONS

International Preliminary Report on Patentability, International Application No. PCT/US2010/027899, Sep. 20, 2011, 6pgs.
"Powder Metallurgy Design Manual," 3rd Edition, copyright Metal Powder Industries Federation, 1998.
U.S. Appl. No. 13/677,836, "Multi-Layered Coating Providing Corrosion Resistance to Zirconia Based Electrolytes," filed Nov. 15, 2012, Specification and drawings, 45 pgs.
U.S. Appl. No. 13/678,709, "Fuel Cell Interconnects and Methods of Fabrication," filed Nov. 16, 2012, Specification and drawings, 48pgs.
U.S. Appl. No. 13/679,092, "Method of Making Fuel Cell Interconnect Using Powder Metallurgy," filed Nov. 16, 2012, Specification and drawings, 26 pgs.
International Search Report & Written Opinion issued in PCT Application No. PCT/US2012/065508, mailed on Apr. 14, 2011.
International Preliminary Report on Patentability received in connection with International Application No. PCT/US2012/065508, mailed May 30, 2014.
International Preliminary Report on Patentability received in connection with International Application No. PCT/US2012/065531, mailed May 30, 2014.
Haynes International High-Temperature Alloys, "Haynes (Reg.) 214 (TM) alloy", 1996, pp. 1-19.
Haynes International High Temperature Alloys, "Haynes (Reg.) 230(TM) alloy", 2004, pp. 1-27.
International Search Report & Written Opinion, International Application No. PCT/US2007/08224, Nov. 26, 2008, 10 pgs.
International Search Report, International Application No. PCT/US2003/04808, Aug. 19, 2003, 9pgs.
Supplementary European Search Report, International Application No. PCT/US2003/04808, Jun. 2, 2008, 3pgs.
International Search Report & Written Opinion, International Application No. PCT/US2010/027899, Oct. 20, 2010, 11pgs.

* cited by examiner

FUEL CELL INTERCONNECT HEAT TREATMENT METHOD

RELATED APPLICATIONS

This application claims the benefit of priority to U.S. Provisional Application No. 61/561,344, entitled "Fuel Cell Interconnects and Methods of Fabrication," filed on Nov. 18, 2011. This application is related to U.S. application Ser. No. 13/678,709, entitled "Fuel Cell Interconnects and Methods of Fabrication," filed on even date herewith, and to U.S. application Ser. No. 14/687,365, entitled "Method of Making Fuel Cell Interconnect Using Powder Metallurgy," filed on even date herewith. The entire contents of these applications are incorporated by reference herein.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In order to optimize the operation of SOFCs, the oxidizing and fuel flows should be precisely regulated. Therefore, the flow regulating structures, such as interconnects in the fuel cell system should be precisely manufactured. Furthermore, the interconnects of the fuel cell system should be manufactured to have a coefficient of thermal expansion (CTE) that matches the CTE of other components in the stack, such as the SOFC electrolyte.

SUMMARY

Embodiments include methods for fabricating an interconnect for a fuel cell stack that include placing a compressed metal powder interconnect on a porous support, and sintering the interconnect in the presence of a non-oxidizing gas.

In various embodiments, the method further includes placing the sintered interconnect on a porous support; and oxidizing the interconnect in the presence of flowing air.

In various embodiments, the method further includes placing the sintered interconnect on a dense, non-porous support; and oxidizing the interconnect in the presence of a gas comprising pure oxygen or an oxygen/inert gas mixture that is substantially nitrogen-free.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1:
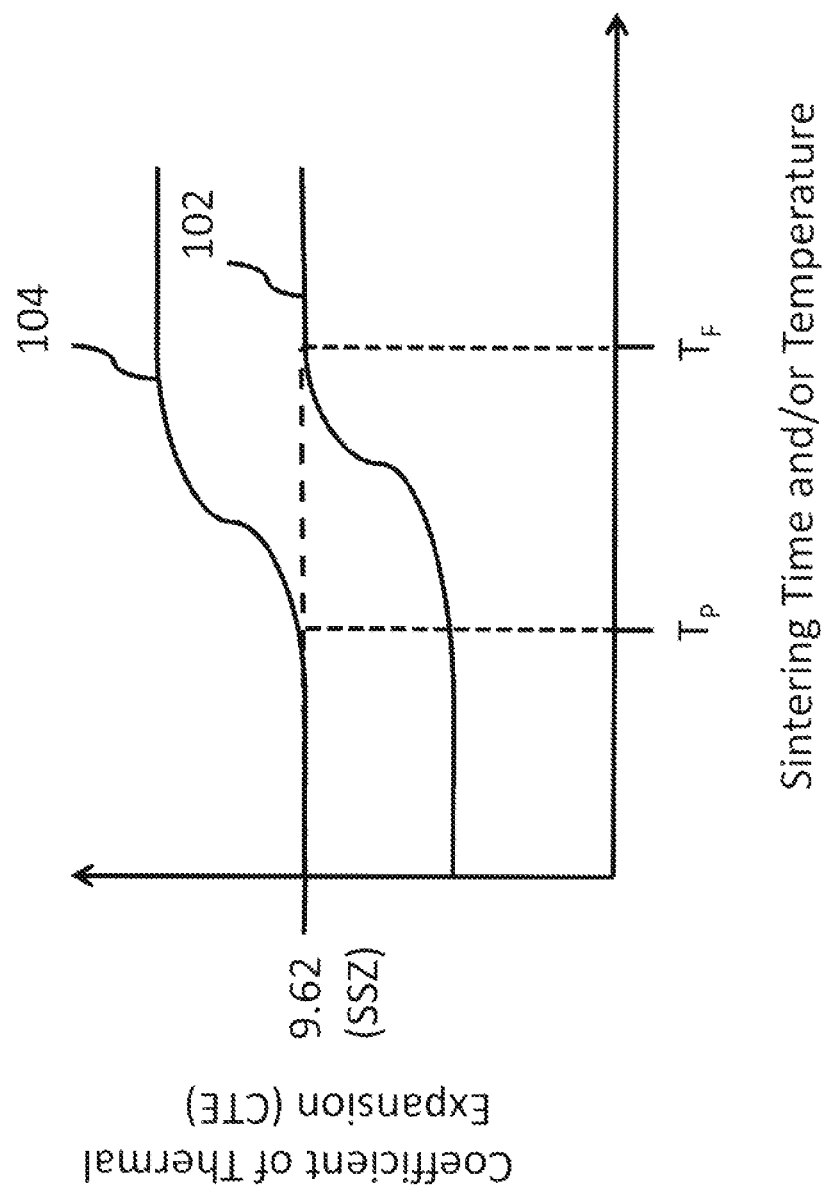
FIG. 1 schematically illustrates the relationship between coefficient of thermal expansion (CTE) and sintering time and/or temperature for two chromium-iron alloys having different iron concentrations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments include interconnects for a fuel cell stack, and methods of manufacturing such interconnects by metal powder pressing using a single press, near net shape process. In one embodiment, the interconnects are composed of a metallic material including chromium and iron (e.g., Cr—Fe alloy), with an iron concentration of greater than about 7% by weight. In preferred embodiments, the interconnect includes at least about 75% chromium by weight, preferably at least about 80% chromium by weight, and can include up to about 93% chromium by weight. The interconnect can include between about 7% and 20% iron by weight. In various embodiments, the interconnect can include at least about 8% iron by weight, more particularly at least about 9% iron by weight, even more particularly at least about 10% iron by weight. In various embodiments, the interconnect can include between about 10% and 20% iron by weight, more particularly between about 10% and 15% iron by weight. In various embodiments, the interconnect can include between about 15% and 20% iron by weight, and preferably includes about 15% iron by weight. The interconnect may optionally contain less than about 5% by weight of other elements, such as yttrium (Y), e.g., 0-1% yttrium by weight.

In various embodiments, the fuel cell interconnect containing chromium and a greater than 7% by weight iron component is further characterized by a coefficient of thermal expansion (CTE) that is within 5% of the CTE of an electrolyte material for a solid oxide fuel cell, and preferably within 1% of the CTE of an electrolyte material for a solid oxide fuel cell. The solid oxide fuel cell can include a ceramic electrolyte material, which can be a stabilized zirconia, such as scandia stabilized zirconia (SSZ) or yttria stabilized zirconia (YSZ). Alternatively, the electrolyte may comprise another ionically conductive material, such as a doped ceria. In some embodiments, the CTE of the interconnect can be between about $7\times10^{-6}/°$ C. and $13\times10^{-6}/°$ C., such as $9\text{-}10\times10^{-6}/°$ C. (e.g., between $9.53\times10^{-6}/°$ C. and $9.71\times10^{-6}/°$ C., such as between $9.57\text{-}9.67\times10^{-6}/°$ C.) and preferably about $9.62\times10^{-6}/°$ C., to match the $9.62\times10^{-6}/°$ C. CTE of SSZ. Alternatively, the CTE of the interconnect can be between $10\text{-}11\times10^{-6}/°$ C. (e.g., $10.4\text{-}10.6\times10^{-6}/°$ C., such as about $10.5\times10^{-6}/°$ C.), and preferably about $10.5\times10^{-6}/°$ C. to match the $10.5\times10^{-6}/°$ C. CTE of YSZ.

In various embodiments, the interconnect can be a compacted powder metal part formed using a powder metallurgy process. The powder metal material, which can include chromium and a greater than 7% iron (e.g., chromium powder and iron powder or Cr—Fe alloy powder), can be pressed (compacted) into a desired shape, and then sintered at an elevated temperature to provide the interconnect. In preferred embodiments, the interconnect can be partially sintered to provide an interconnect with sufficient mechanical stability and a CTE that approximately matches the CTE of a fuel cell electrolyte material.

FIG. 1 schematically illustrates the relationship between the CTE of a chromium-iron powder metal material and the sintering time and/or temperature of the material. In selecting the material composition of the interconnect, an important consideration is the coefficient of thermal expansion (CTE) of the finished interconnect. In general, the CTE of the finished interconnect should match the CTE of the electrolyte material of an electrolyte supported fuel cell (or of an electrode of an electrode supported fuel cell) that is adjacent to the interconnect in the fuel cell stack. In the case of a solid oxide fuel cell (SOFC), for example, the CTE of the interconnect should match the CTE of the ceramic electrolyte, such as scandia stabilized zirconia (SSZ). In practice, the requirement to match the CTE of the ceramic electrolyte has limited the composition of the material(s) used in the interconnects. Most commonly, the metallic material used consists of a chromium-iron alloy, with approximately 5% iron content by weight.

The reason for this is illustrated by curves 102 and 104 in FIG. 1. Curve 102 schematically illustrates the CTE of a conventional chromium-iron material with 5% iron content by weight as a function of sintering time and/or temperature. It can be observed that the CTE of the material is not constant during the sintering process, but in fact increases with increases in sintering time and/or temperature. In general, the curve 102 follows an "S"-shape, with an initial period of relatively low, stable CTE, followed by an intermediate period of rapid increase of the CTE of the material (generally between points $T_P$ and $T_F$ in FIG. 1) and then another period of relatively high, stable CTE when the material becomes fully sintered (indicated by $T_F$ in FIG. 1).

The chromium-iron material with approximately 5% iron content is conventionally used for interconnects for a fuel cell stack because when the material is fully sintered, the CTE of the material approximately matches the CTE of the solid oxide fuel cell electrolyte, which for a SSZ electrolyte is $9.62\times10^{-6}/°$ C. as shown in FIG. 1.

A chromium-iron material having a higher iron content would be desirable in terms of certain material properties, including providing a softer alloy that is easier to work with. Such an alloy having a higher iron content may further allow the interconnect to be formed by a single press, net shape or near net shape process. However, such high iron content materials have not been thought possible for use in a fuel cell interconnect due to the significant CTE mismatch. This is illustrated by curve 104 of FIG. 1, which schematically illustrates the CTE of a chromium-iron material with 15% iron content by weight as a function of sintering time and/or temperature. As can be seen in FIG. 1, the CTE of the 15% iron content material is significantly higher than the CTE of the SSZ electrolyte once the material is fully sintered at time and/or temperature $T_F$.

Further embodiment methods for fabricating an interconnect for a fuel cell stack include the steps of providing a compressed metal, ceramic or cermet powder interconnect, partially sintering the interconnect at an elevated temperature, and stopping the sintering before the part is fully sintered and when the interconnect has a coefficient of thermal expansion (CTE) that is within 5% of the CTE of an electrolyte material for a solid oxide fuel cell to be used in the stack with the interconnect. In preferred embodiments, the CTE is within 2% of the CTE of the electrolyte material, such as within about 1.5% of the CTE of the electrolyte material (e.g., for 10 atomic percent scandia SSZ SOFC electrolyte, the interconnect CTE may be within 5% (e.g., within 2 or 1.5% of the $9.62\times10^{-6}/°$ C. CTE value of the electrolyte; the CTE value would differ for other electrolytes). The compressed powder metal interconnect is not limited to chromium-based interconnects (e.g., Cr—Fe based interconnects), and may optionally include other interconnects, such as steel, ceramic or cermet based interconnects. In some embodiments, the interconnect has a CTE that is within 1% of the CTE of other interconnects and/or end plates in the same fuel cell stack, and is preferably within about 0.5% of the CTE of other interconnects and/or end plates in the stack, such as within about 0.2% of the CTE of other interconnects and/or end plates in the stack. This provides a stack having interconnects with a uniform CTE.

Figure 2:
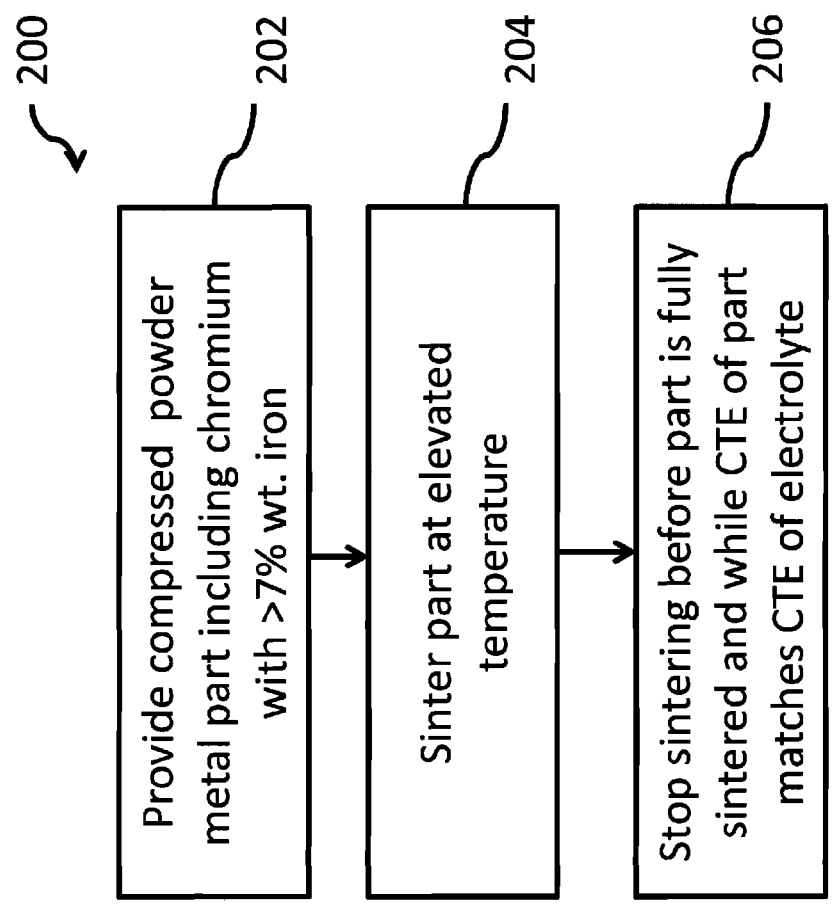
FIG. 2 is a process flow diagram illustrating an embodiment method for fabricating an interconnect for a fuel cell stack having an iron content greater than about 7% by weight.

FIG. 2 is a flow diagram illustrating an embodiment method 200 for fabricating an interconnect which comprises chromium and iron, with an iron concentration of greater than about 7% by weight. The method 200 includes providing a compressed powder metal part including chromium and iron, with a greater than 7% by weight iron content at step 202, and sintering the part at an elevated temperature at step 204. As illustrated in FIG. 1, the CTE for the high iron content material approximately matches the CTE of a SOFC electrolyte material during an initial sintering time and/or temperature, as shown by curve 104. The embodiment method 200 can include stopping the sintering process before the part is fully sintered and while the CTE of the part approximately matches the CTE of the electrolyte material at step 206. In various embodiments, the part can be partially sintered to provide an interconnect with relatively high iron content and sufficient mechanical stability, and a CTE that approximately matches the CTE of the fuel cell electrolyte material. In various embodiments, the sintering is stopped while the CTE of the part is within 5% of the CTE of the electrolyte material, and preferably within 1% of the CTE of the electrolyte material. As schematically illustrated in FIG. 1, the sintering of the part can be stopped at or before point $_{TP}$ on curve 104, which is the point at which the part begins to undergo a rapid increase in CTE in the intermediate portion of the "S"-shaped CTE curve.

In general, the method 200 utilizes partial sintering of a compressed powder metal including chromium and a greater than 7% by weight iron content. The partial sintering can include shorter sintering times and/or lower sintering temperatures than employed in a conventional sintering process for fuel cell interconnects. In various embodiments, the interconnect can be partially sintered at a temperature between about 1100° C. and 1520° C., and preferably between about 1250° C. and 1350° C. The interconnect can be partially sintered for between about 0.5 and 5 hours, and preferably between about 1.5 and 3 hours.

The metal powder used to provide a fuel cell interconnect in various embodiments can comprise a mixture of chromium and iron powder or a pre-alloyed powder containing chromium and iron. In various embodiments, the pre-alloyed powder can include an iron content of greater than 7% by weight.

Figure 3:
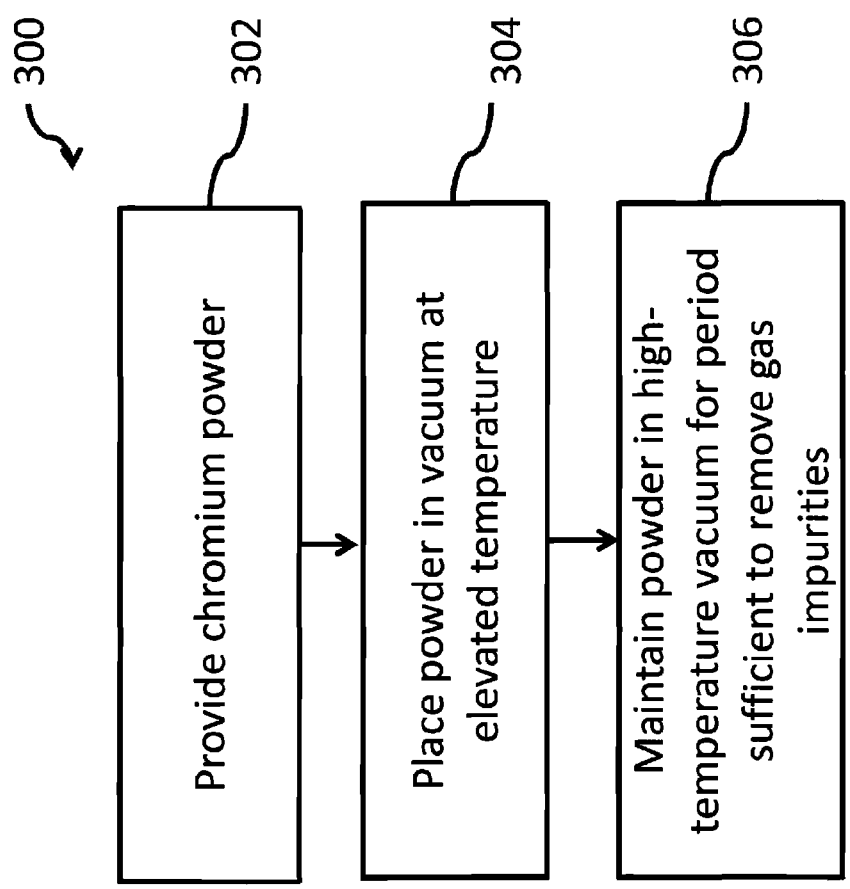
FIG. 3 is a process flow diagram illustrating an embodiment method for reducing impurities in a chromium powder.

In various embodiments, the chromium-containing powder material used in fabricating the interconnects can be substantially pure and free of impurities prior to pressing and sintering the material. FIG. 3 is a process flow diagram illustrating an embodiment method 300 for reducing impurities in a chromium powder. The method 300 includes providing a chromium containing powder (e.g., chromium powder, chromium and iron powder mixture or chromium-iron alloyed powder particles) at step 302, placing the powder in a vacuum at elevated temperature at step 304, and maintaining the powder in a high-temperature vacuum for a period sufficient to remove gas phase impurities from the chromium containing powder at step 306. In various embodiments, a "double degassing" method can include placing the chromium powder in a vacuum at a temperature between about 1200° C. and 1600° C., and preferably about 1400° C., for a period of between about 2 and 3 days, and preferably about 2.5 days. This results in the outgassing of various gas phase impurities in the powder, which are removed from the vacuum by the pump used to maintain the vacuum. This increases the compressibility of the powder in the subsequent pressing step. The chromium containing powder can include chromium and iron having an iron content of between about 3-7% by weight, such as 5% by weight. In some embodiments, the chromium containing powder can include an iron content that is greater than 7% by weight, such as 7-20% by weight, as described above.

Figure 4:
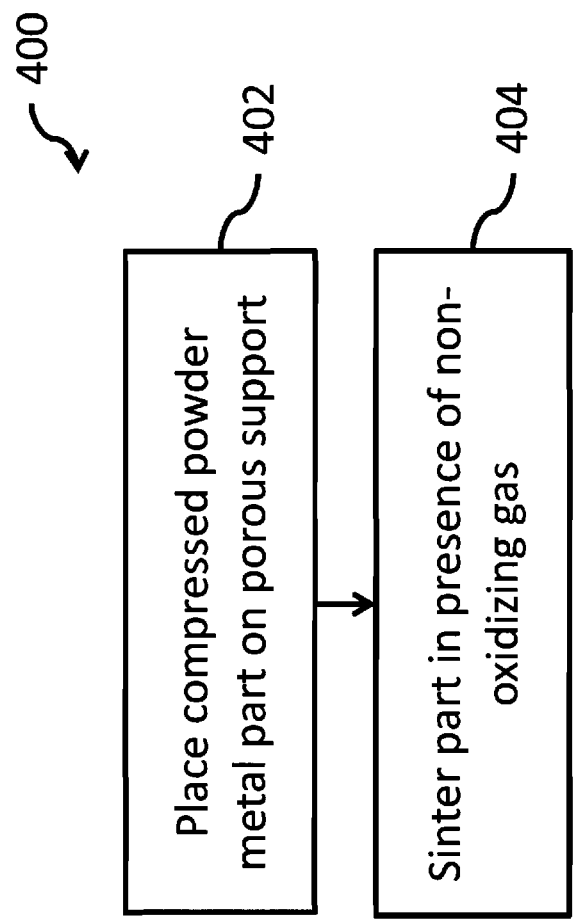
FIG. 4 is a process flow diagram illustrating an embodiment method for sintering an interconnect using a porous support.

FIG. 4 is a process flow diagram illustrating an embodiment method 400 for sintering a compressed powder metal part to fabricate an interconnect for a fuel cell stack. The compressed powder metal part can be placed on a porous, low-density support structure at step 402, and sintered in the presence of a non-oxidizing gas at step 404. The porous, low density support structure, which may a porous ceramic or ceramic mesh or grid, can allow the non-oxidizing gas to permeate into the interconnect from all sides during the sintering process, and can help prevent oxidation of the interconnect during the sintering. The sintering process can be a partial sintering process, such as described above in connection with FIG. 2. The non-oxidizing gas can comprise hydrogen or another similar gas, such as forming gas, which prevents interconnect oxidation during sintering. The compressed powder interconnect can include chromium and iron having an iron content of between about 3-7% by weight, such as 5% by weight. In some embodiments, the compressed powder interconnect can include an iron content that is greater than 7% by weight, such as 7-20% by weight, as described above.

After the interconnect is partially or fully sintered, the interconnect can then be oxidized. Damage to the cells in a fuel cell stack can be reduced or prevented by exposing the interconnects to an oxidizing ambient, such as air at high temperature, prior to use of the interconnect in the stack. The high temperature air exposure causes oxide formation and the associated geometric distortion of the interconnects prior to the attachment of the seals and the interconnect to the cells, such as to the electrolyte and/or the electrodes of the cells. The oxidation fills the pores throughout the thickness of the relatively porous powder pressed interconnect, causing a slight change in length and width (e.g., 0.1-0.5%) of the interconnect. During subsequent heat-ups, e.g., during use of the stack, less (or negligible) distortion due to oxidation occurs and the stresses on the cells are greatly reduced compared to stacks containing non-preoxidized interconnects.

Figures 5A, 5B:
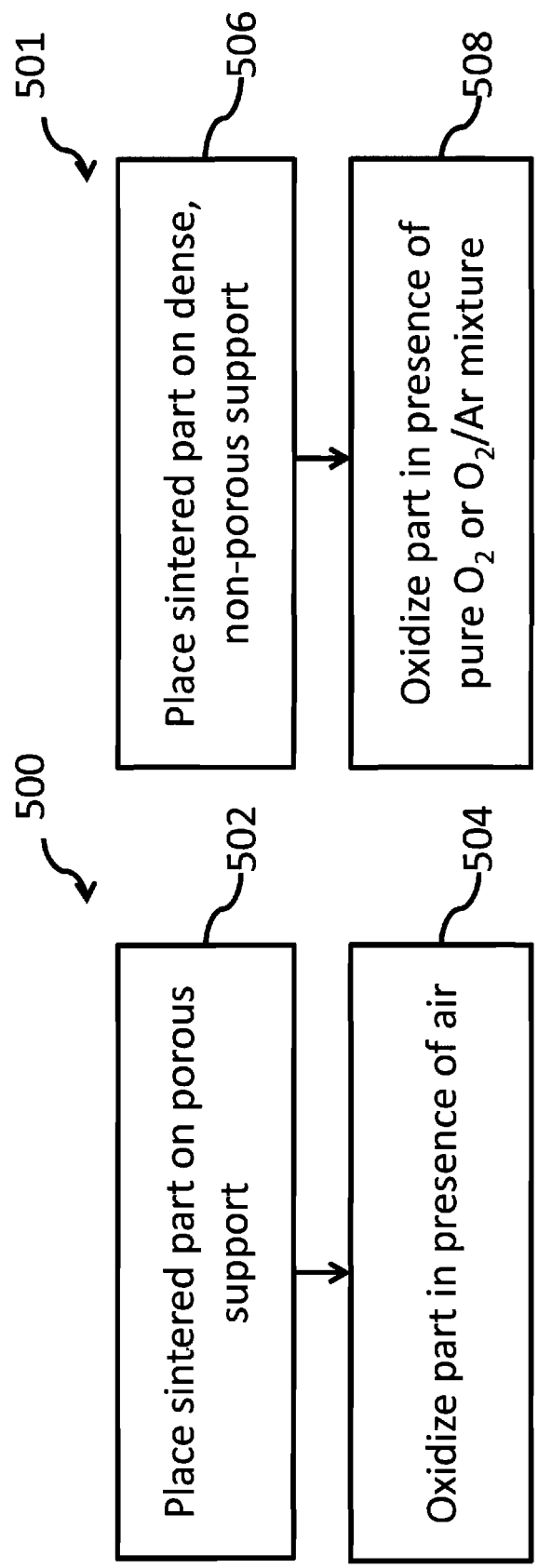
FIGS. 5A and 5B are process flow diagrams illustrating embodiment methods for oxidizing a sintered interconnect.

FIGS. 5A and 5B are process flow diagrams illustrating embodiment methods 500, 501 for oxidizing an interconnect. It has been found that during the oxidation process, the presence of nitrogen in the oxidizing ambient can block oxygen from evenly diffusing into the interconnect. This can result in uneven oxide formation throughout the interconnect. FIG. 5A illustrates an embodiment method 500 for oxidizing a fuel cell interconnect that can minimize or avoid this problem. In the method 500, the fully-sintered or partially-sintered interconnect is provided on a porous support, described above, at step 502, and is oxidized in the presence of air, such as flowing air, at step 504. The porous support allows the air to permeate into the interconnect and purge out nitrogen which can otherwise block oxygen from evenly diffusing into the part of the interconnect in contact with the support. An alternative embodiment method 501 is shown in FIG. 5B. In this method 501, the interconnect is provided on a dense, non-porous support (e.g., non-porous ceramic plate or rack) at step 506, and is oxidized in the presence of either pure oxygen, or a mixture of oxygen with an inert gas, such as argon, at step 508. This embodiment method 501 also prevents nitrogen from blocking the oxygen from evenly diffusing into the part of the interconnect in contact with the support because there is no nitrogen in the ambient. The interconnect that may be oxidized as described above can include chromium and iron having an iron content of between about 3-7% by weight, such as 5% by weight. In some embodiments, the interconnect can include an iron content that is greater than 7% by weight, such as 7-20% by weight, as described above.

Figure 6:
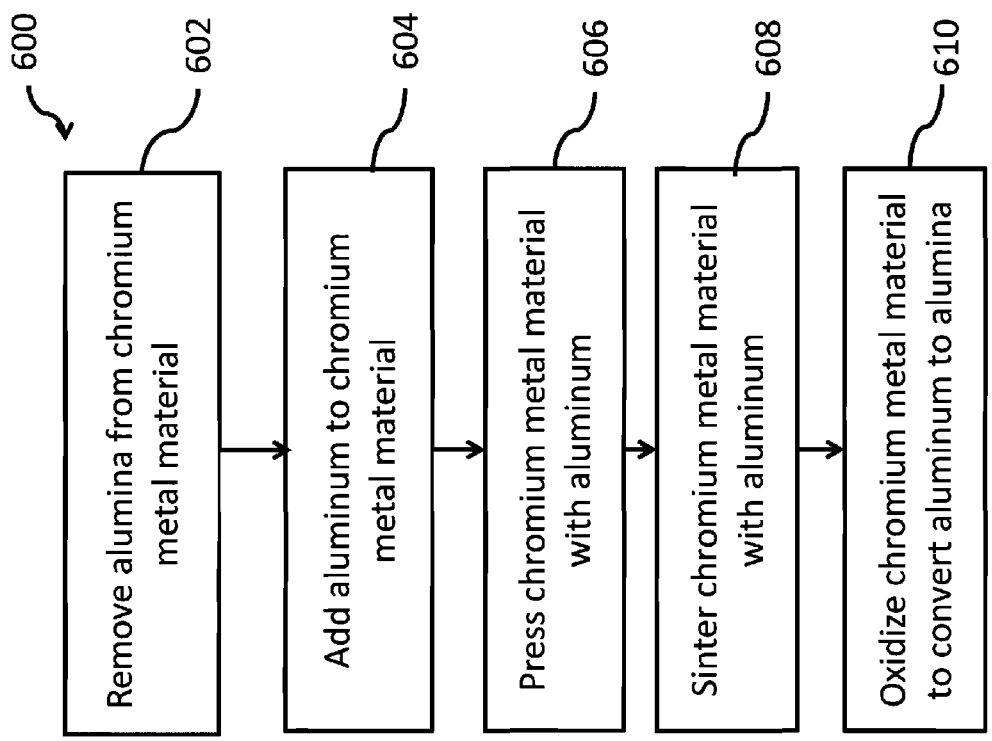
FIG. 6 is a process flow diagram illustrating an embodiment method for fabricating a pressed metal powder interconnect containing alumina.

FIG. 6 is a process flow diagram illustrating an embodiment method 600 for fabricating a pressed metal powder interconnect containing alumina. Small amounts of alumina in the interconnect can be beneficial due to alumina's ability to serve as a "getter" for unwanted contaminants, such as sulfur. Sulfur can cause undesirable spalling of an oxide layer (e.g., chromium oxide) on the interconnect. Small amounts of alumina can be present in the metal powders used to form the pressed interconnect, particularly where the chromium powder is provided via an aluminothermic process.

However, during an interconnect fabrication process using powder metallurgy techniques, the presence of alumina can be undesirable, particularly during the powder compacting step, as alumina is a hard material that can cause wear or damage to the die or press used in the compacting.

In the method 600 illustrated in FIG. 6, prior to compacting a metal powder including chromium (e.g., chromium, chromium and iron, or Cr—Fe alloy), substantially all alumina is removed from the metal powder at step 602. The metal powder can include chromium and iron having an iron content of between about 3-7% by weight, such as 5% by weight. In some embodiments, the powder can include an iron content that is greater than 7% by weight, such as 7-20% by weight, as described above. The alumina can be removed using any suitable technique, such as density separation. At step 604, a small quantity of aluminum (e.g., 200-500 ppm, such as approx. 300 ppm) can be added to the Cr—Fe metal powder. The presence of aluminum in the metal powder stock can be beneficial in terms of making the interconnect powder mix softer and easier to press/compact. The metal powder containing chromium and a small quantity of aluminum is then pressed (compacted) in a die of any suitable press at step 606 to form the desired interconnect shape. The pressed material can then be fully-sintered or partially-sintered at step 608 to solidify the interconnect, as described above. The fully-sintered or partially-sintered interconnect can then be oxidized at step 610, as described above. The oxidation can include exposing the interconnect to an oxidizing gas, such as air or oxygen, at high temperature (e.g., 900° C. to 1100° C.) to form oxides, including $Cr_2O_3$, $Fe_2O_3$, and/or $Fe_3O_4$, in voids throughout the interconnect thickness. The oxidation step further results in at least a portion of the aluminum added to the interconnect prior to pressing being converted to alumina ($Al_2O_3$) in the finished interconnect. Thus, the alumina is first removed and then formed in the interconnect.

Figure 7:
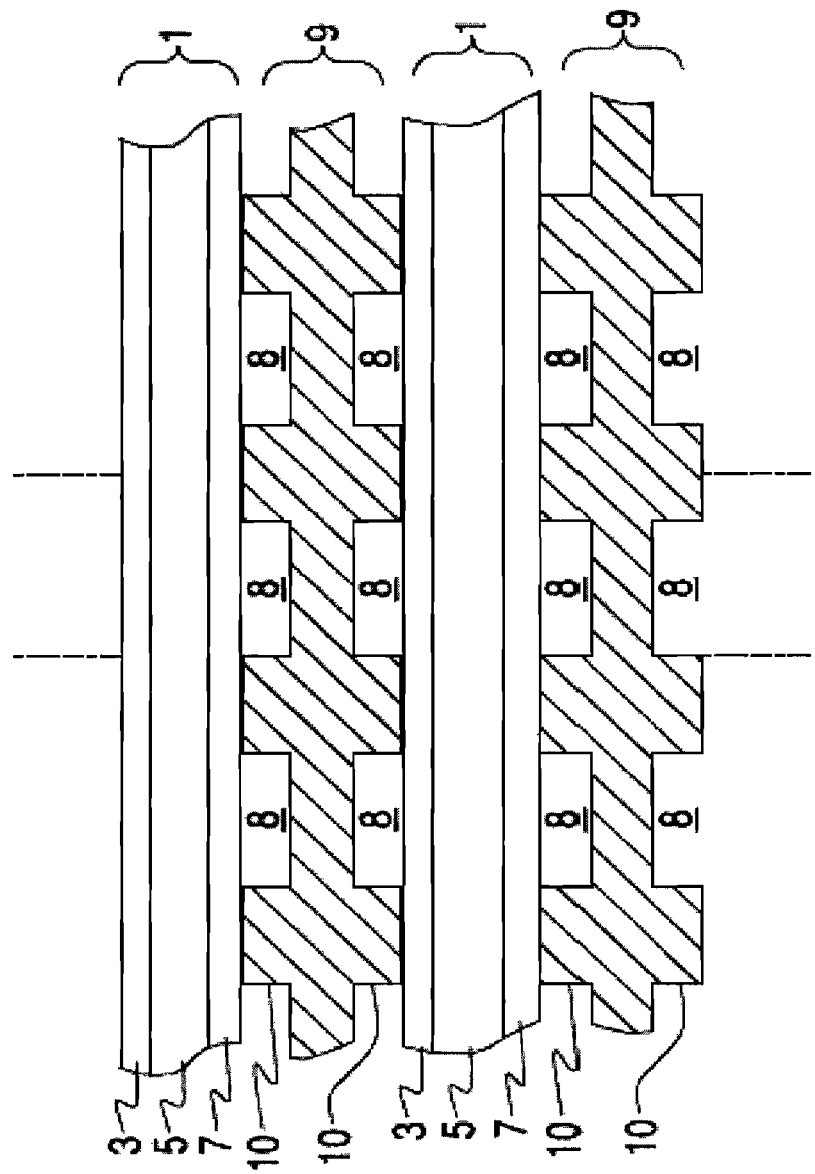
FIG. 7 illustrates a side cross-sectional view of a SOFC stack.

Various embodiments relate to an interconnect configuration and geometry for a fuel cell stack. The interconnects in these embodiments can include chromium and iron having an iron content of between about 3-7% by weight, such as 5% by weight. In some embodiments, the interconnect can include an iron content that is greater than 7% by weight, such as 7-20% by weight, as described above. An example of a solid oxide fuel cell (SOFC) stack is illustrated in FIG. 7. Each SOFC 1 comprises a cathode electrode 7, a solid oxide electrolyte 5, and an anode electrode 3. Fuel cell stacks are frequently built from a multiplicity of SOFC's 1 in the form of planar elements, tubes, or other geometries. Fuel and air has to be provided to the electrochemically active surface, which can be large.

The gas flow separator 9 (referred to as a gas flow separator plate when part of a planar stack), containing gas flow passages or channels 8 between ribs 10, separates the individual cells in the stack. Frequently, the gas flow separator plate 9 is also used as an interconnect which electrically connects the anode or fuel electrode 3 of one cell to the cathode or air electrode 7 of the adjacent cell. In this case, the gas flow separator plate which functions as an interconnect is made of or contains electrically conductive material. The interconnect/gas flow separator 9 separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. At either end of the stack, there may be an air end plate or fuel end plate (not shown) for providing air or fuel, respectively, to the end electrode. FIG. 7 shows that the lower SOFC 1 is located between two interconnects 9.

Figure 8A:
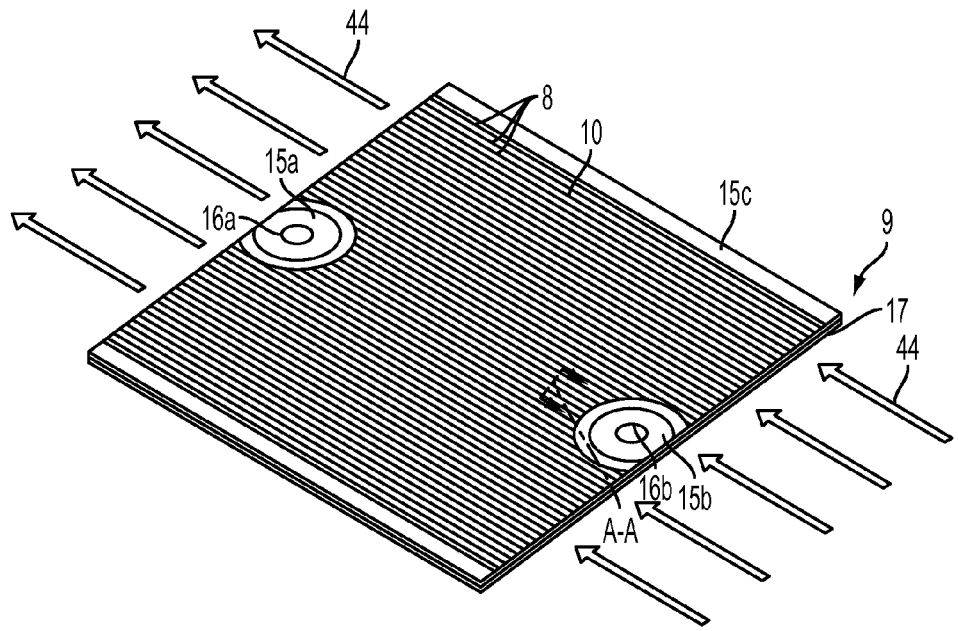
FIG. 8A is a perspective view of a cathode side of an interconnect.
Figure 8B:
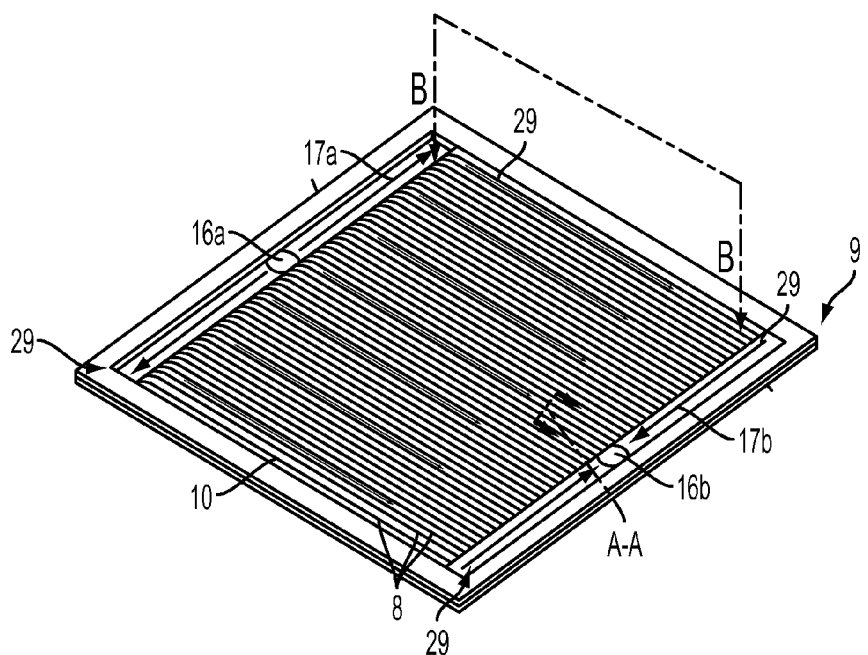
FIG. 8B is a perspective view of an anode side of an interconnect.

FIGS. 8A and 8B show, respectively, top and bottom views of an interconnect 9. The portions of interconnect 9 shown in side cross-section in FIG. 7 are provided along lines A-A in FIGS. 8A and 8B. The interconnect 9 contains gas flow passages or channels 8 between ribs 10. The interconnect 9 in this embodiment includes at least one riser channel 16a for providing fuel to the anode-side of the SOFC 1, as illustrated by arrow 29. The riser channel 16a generally comprises a fuel inlet riser opening or hole that extends through at least one layer of the fuel cells and interconnects in the stack. As illustrated in FIG. 8B, the fuel can flow through the inlet riser channel 16a to the anode-side of each fuel cell. There, the fuel can collect in an inlet plenum 17a (e.g., a groove in the interconnect's surface), then flow over the fuel cell anode 3 through gas flow channels 8 formed in the interconnect 9 to an outlet plenum 17b and then exit through a separate outlet riser channel 16b.

The cathode side, illustrated in FIG. 8A, can include gas flow passages or channels 8 between ribs 10 which direct air flow 44 over the cathode electrode of the fuel cell. Seals 15a, 15b can seal the respective risers 16a, 16b on the cathode-sides of the interconnect and fuel cell to prevent fuel from reaching the cathode electrode of the fuel cell. The seals may have a donut or hollow cylinder shape as shown so that the risers 16a, 16b extend through the hollow middle part of the respective seals 15a, 15b. The seals 15a, 15b can include a elevated top surface for contacting against the flat surface of the adjacent SOFC 1. A peripheral seal 15c can seal the anode-sides of the interconnect and fuel cell to prevent air from reaching the anode electrode of the fuel cell.

In FIGS. 8A and 8B, the riser channel openings 16a, 16b are shown as fuel inlet and fuel outlet openings in the interconnect 9. This interconnect is configured for a fuel cell stack which is internally manifolded for fuel, in which the fuel travels through the stack through fuel riser channels which are formed by mated openings through the stacked interconnects and fuel cells. However, if desired, the interconnect 9 may be configured for a stack which is externally manifolded for fuel. In this case, the top and bottom edges of the interconnect 9 shown in FIG. 8B would function as fuel inlet and outlet, respectively, for the fuel which flows externally to the stack. Furthermore, the interconnect 9 shown in FIGS. 8A and 8B is configured for a stack which is externally manifolded for air. However, additional openings through the interconnect may be formed, such as on the left and right sides of the interconnect, for the interconnect to be configured for a stack which is internally manifolded for air.

Many fuel cell interconnects are fabricated from formed sheet metal or via machining from stock material. In recent years, some interconnects have been fabricated using a powder metallurgy technique, such as the various embodiment methods described above, in which a process of pressing and sintering metal powders is used to make the interconnects. However, many features of the pressed-powder interconnects currently in use are driven by the older metal machining techniques. There is a need for improved designs for fuel cell interconnects that are easier to form via powder pressing, minimize low-density areas, provide greater mechanical stability, and/or include shallower features to reduce powder movement/compaction.

Figure 9:
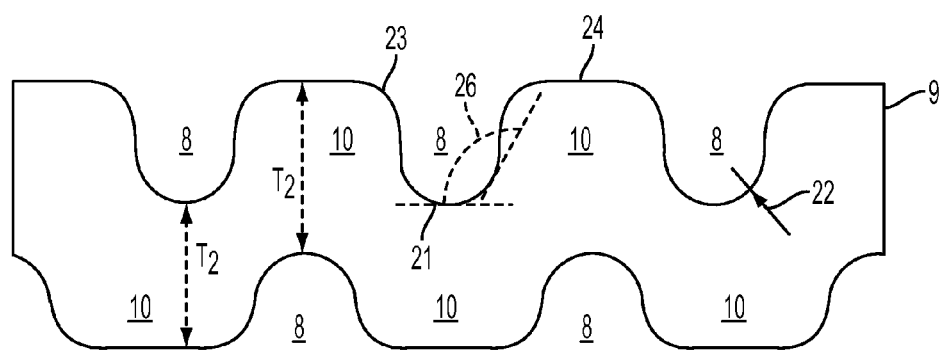
FIG. 9 is a cross-sectional view of an embodiment interconnect having a rib and groove structure.

FIG. 9 illustrates an exemplary embodiment of a fuel cell interconnect 9 having gas flow channels 8 and ribs 10 with curved surfaces. The interconnect 9 is shown in side-cross section along line A-A in FIGS. 8A and 8B. In some embodiments, the gas flow channels 8 can have rounded surfaces 21. In some embodiments, such as shown in FIG. 9, the rounded surfaces 21 may form a gas flow channel 8 having a semi-circular cross section, in contrast to conventional channels, which have rectangular or trapezoidal cross sections. The semi-circular cross-section of the channels 8 can provide shallower channel depth (e.g. 0.3-0.4 mm compared to 0.5 mm in conventional trapezoidal cross-section) at same fluid volume. Compared to conventional rectangular or trapezoidal channels, the semi-circular cross-section channels 8 are significantly easier to form by powder pressing. In some embodiments, the rounded surfaces 21 may transition to a flat surface over a portion of the gas flow channel 8.

As shown in FIG. 9, the ribs 10 and channels 8 on opposite sides of the interconnect 9 can be offset relative to each other to promote uniform density of the pressed metal powder, as described in commonly-owned U.S. patent application Ser. No. 11/707,070, the entire contents of which are incorporated herein by reference. As shown in FIG. 9, the offset ribs 10 can provide an interconnect 9 having a substantially uniform thickness (e.g., $T_2$) over at least the portion of the interconnect containing the ribs 10. In other embodiments, the ribs 10 and channels 8 on opposite sides of the interconnect need not be offset and can be aligned with one another, such as shown in FIG. 7.

As shown in FIG. 9, the ribs 10 can include a flat top surface 24, meaning that the top surface of the rib 10 is planar or substantially planar over the majority of the surface, which provides good contact surface area with fuel cell electrodes. The ribs 10 can include rounded edges 23 between top surface of the rib 10 and the adjacent gas flow channel 8, rather than the sharp angled edge in conventional interconnects. The rounded edge(s) 23 of the ribs 10 can have a first radius of curvature and the rounded surfaces 21 of the channels 8 can have a second radius of curvature. In various embodiments, the first radius of curvature can be larger than the second radius of curvature. Alternatively, the second radius of curvature can be larger than the first radius of curvature. A large radius of curvature in the channel 8 allows for a large channel area without having to push the powder too far down into the interconnect (i.e., the powder moves laterally into the ribs 10, where there is less powder resistance).

Figure 10A:
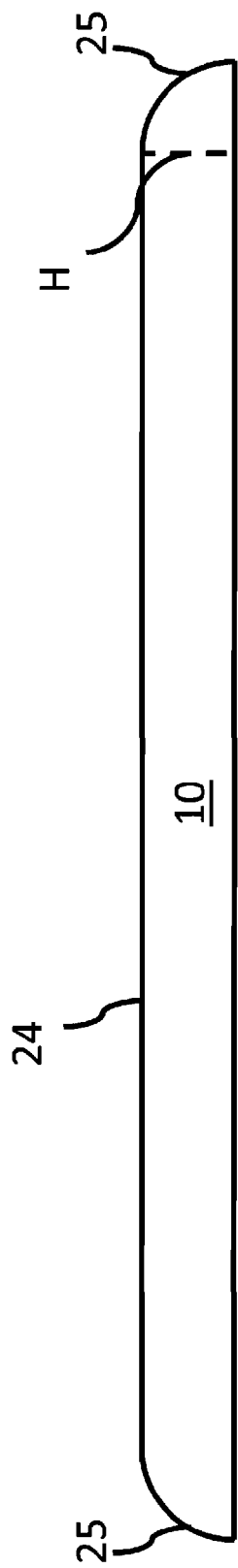
FIG. 10A is a side view of a rib of an embodiment interconnect taken along line B-B in FIG. 8B.

FIG. 10A illustrates a side view of a rib 10 in one embodiment, along line B-B in FIG. 8B. The rib 10 can include a tapered top surface at the end(s) of the rib, meaning that the top surface of the rib is rounded, curved or angled or otherwise tapered at the end(s) 25 of the rib 10, providing the ends 25 of the ribs with a tapered profile in the vertical dimension along the rib length as shown in FIG. 10A. Thus, a rib 10 having a tapered top surface can taper at its end 25 from an initial rib height (H) that may decrease towards the major surface of the interconnect 9.

Figure 11A:
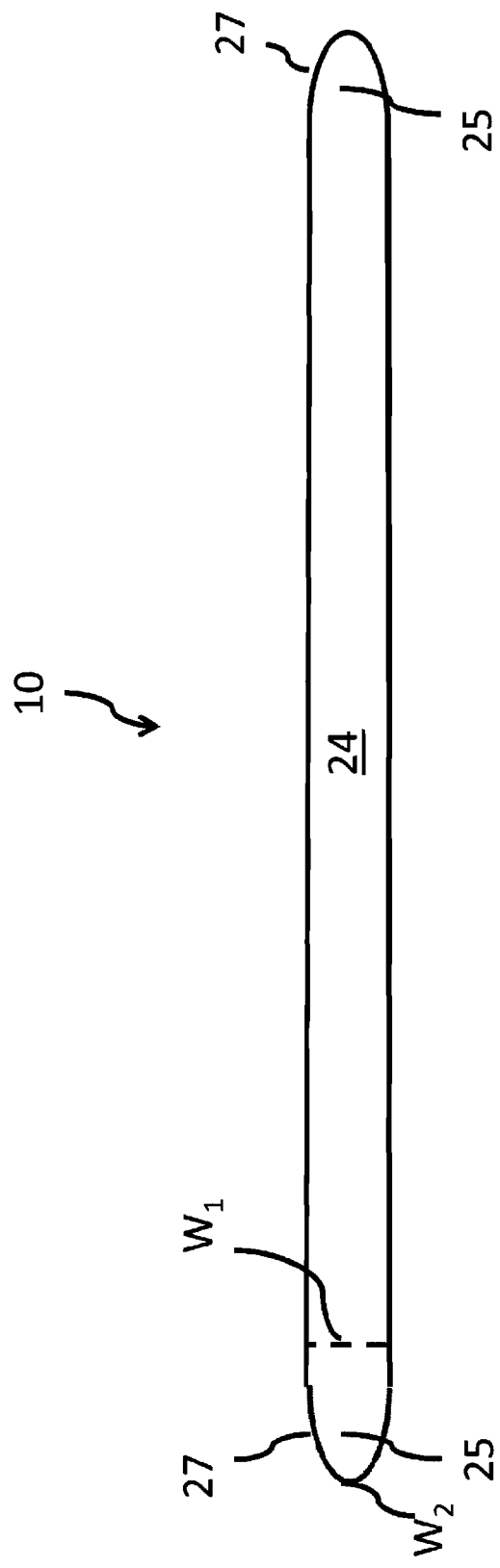
FIG. 11A is a top view of a rib of an embodiment interconnect.

The end(s) 25 of the rib 10 can further include tapered side surface(s) 27, meaning that the side surface of the rib is rounded, curved or angled or otherwise tapered at the end(s) of the rib, providing the end(s) 25 of the rib 10 with a tapered profile in the horizontal dimension, parallel to the major surface of the interconnect 9, as shown in FIG. 11A, in addition to having a tapered profile in the vertical dimension. Thus, a rib 10 having a tapered side surface 27 can taper at its end 25 from an initial width ($W_1$) to a second, smaller width ($W_2$), which can be a point.

Figure 10B:
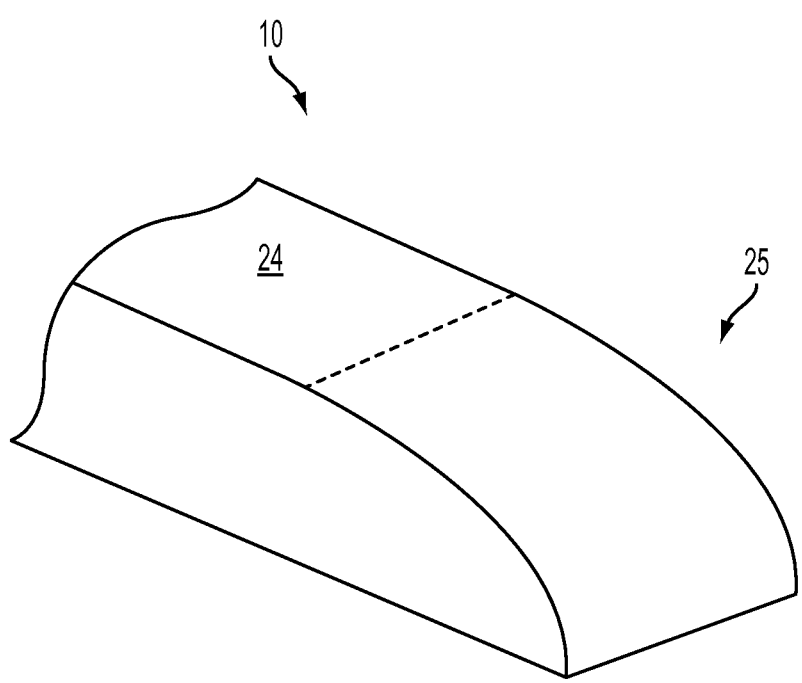
FIG. 10B is a perspective view of an end of a rib according to one embodiment.

FIG. 10B is a perspective view of an end 25 of a rib 10 according to one embodiment. The rib 10 can have a flat top surface 24 over most of its length and a tapered top surface at the end 25 of the rib 10. The tapered top surface in this embodiment is a rounded surface that provides a tapered profile in the vertical dimension along the rib length. The rib 10 may be tapered from the flat top surface 24 to the major surface of the interconnect 9. In this embodiment, the rib 10 does not have a tapered side surface.

Figure 11B:
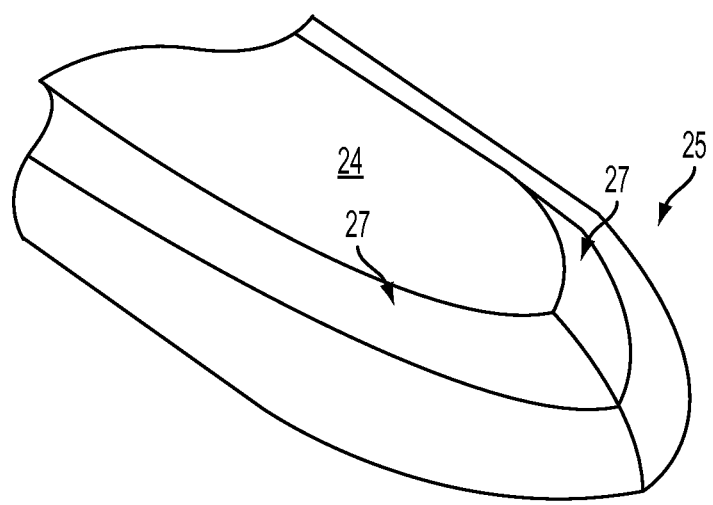
FIG. 11B is a perspective view of an end of a rib according to one embodiment.

FIG. 11B is a perspective view of an end 25 of a rib 10 according to another embodiment. As in the embodiment of FIG. 10B, the rib 10 can have a flat top surface 24 over most of its length and a tapered top surface at the end 25 of the rib 10. In the embodiment of FIG. 11B, the rib 10 additionally has a tapered side surface 27 at the end 25 of the rib 10. The tapered side surface 27 in this embodiment is a rounded surface that provides a tapered profile in the horizontal dimension along the rib length.

Figure 12:
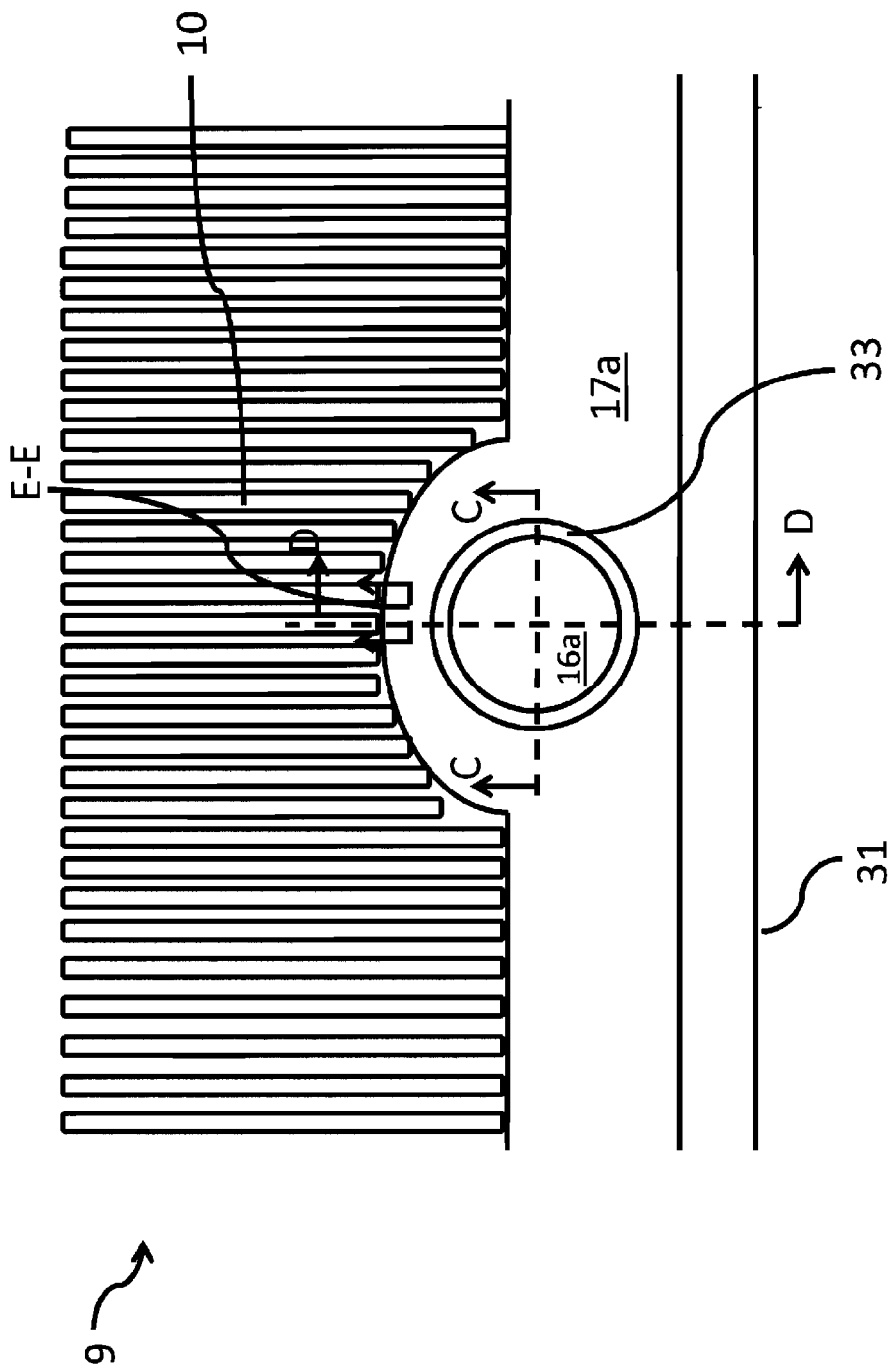
FIG. 12 is a plan view of a portion of an anode-side of an embodiment interconnect having a riser opening and plenum.
Figure 13:
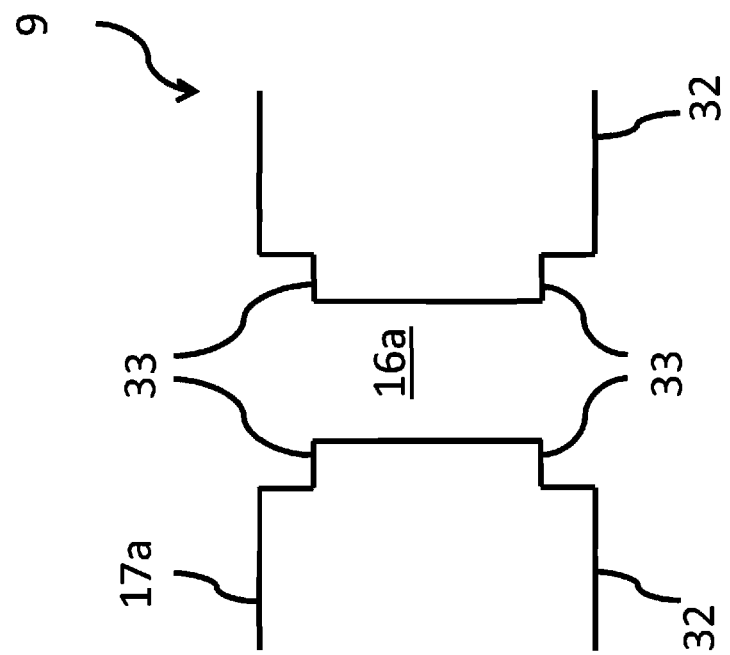
FIG. 13 is a side cross-section view of an embodiment interconnect taken along line C-C in FIG. 12.
Figure 14:
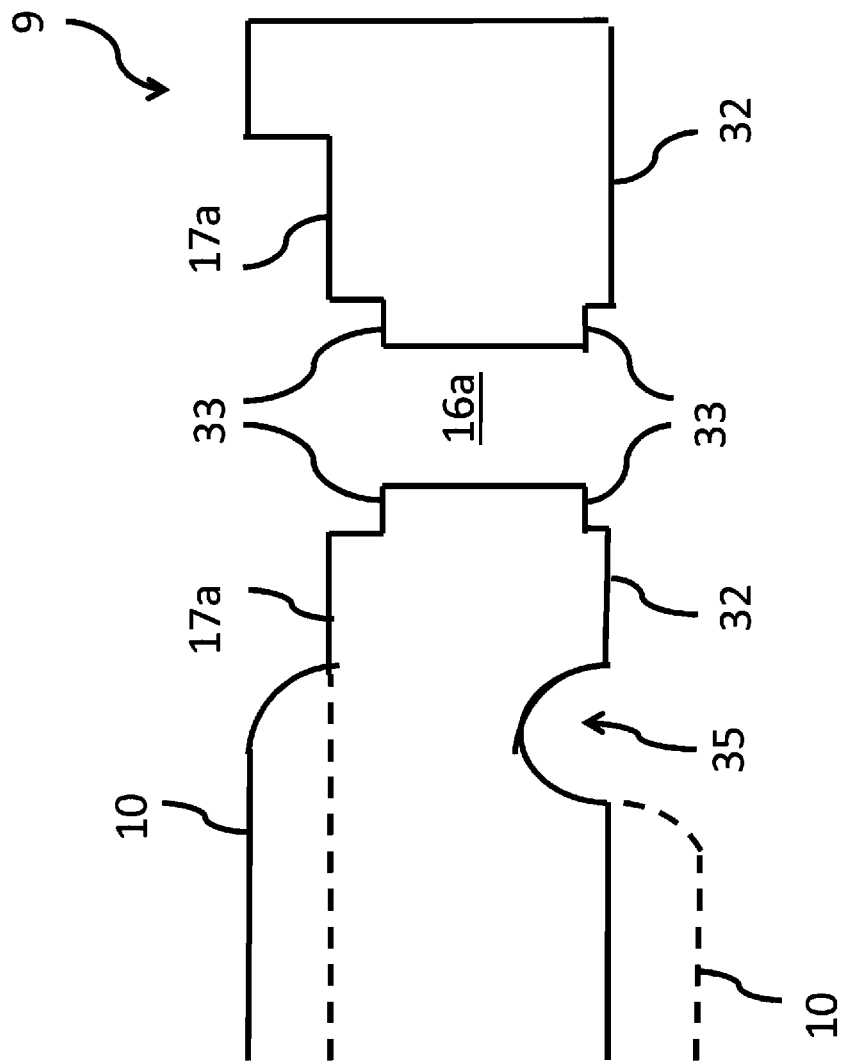
FIG. 14 is a side cross-section view of an embodiment interconnect taken along line D-D in FIG. 12.
Figure 15:
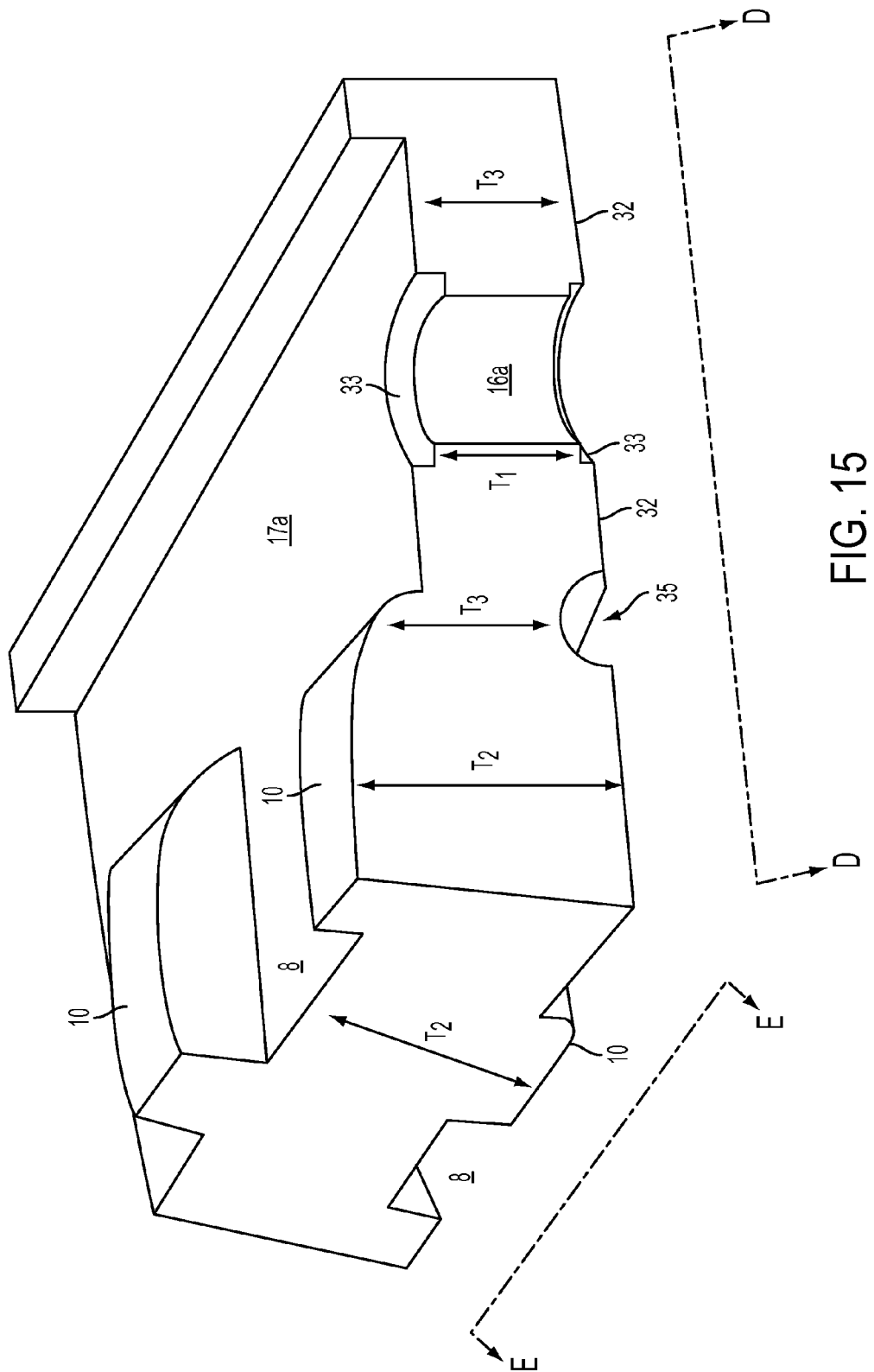
FIG. 15 is a cross-section perspective view of an embodiment interconnect taken along lines D-D and E-E in FIG. 12.

FIG. 12 is a top view of a portion of the anode-side of an interconnect 9 according to another embodiment, showing a riser opening 16a and fuel plenum 17a proximate a first end 31 of the interconnect 9. The interconnect 9 can have a symmetric configuration such that the riser opening 16b and plenum 17b on the opposite end of the interconnect can have an identical configuration, such as shown in FIG. 8B. FIG. 13 is a side cross-section view of a portion of the interconnect 9 taken along line C-C in FIG. 12. FIG. 14 is a side cross-section view of the interconnect 9 taken along line D-D in FIG. 12. FIG. 15 is a perspective cross-section view of the interconnect taken along lines D-D and E-E in FIG. 12.

As shown in FIG. 8A, an interconnect 9 can have one or more flat elevated surfaces where seals 15a, 15b are located on the cathode-side of the interconnect that surround the riser channels 16a, 16b and help prevent fuel from reaching the cathode electrode. Elevated surfaces such as these correspond to low-density areas of a pressed powder interconnect and can result in mechanical instability in the interconnect. In one embodiment interconnect 9, the fuel plenum 17a on the anode-side of the interconnect 9 can extend around the riser channel openings 16a, 16b, as shown in FIGS. 12-14. In various embodiments, the plenum 17a can extend at least about 60% around the circumference of the riser channel opening 16a, more preferably at least about 90%, and even more preferably entirely around the circumference of the riser channel opening 16a, as shown in FIG. 12. As shown in FIG. 14, the fuel plenum 17a can be aligned with and substantially correspond to the flat surface 32 on the opposite (i.e., cathode) side of the interconnect, where the donut seal 15a shown in FIG. 8A will be later deposited. Since the fuel plenum 17a on the anode side of the interconnect generally matches the flat surface 32 on the cathode side of the interconnect, the thickness of the interconnect may be decreased while density of the interconnect is increased in the plenum area, resulting in increased strength and mechanical stability.

As shown in FIG. 12, on the anode side of the interconnect 9, the plenum 17a extends around the riser 16a and into the rib area. The ribs 10 do not extend into the plenum area. The ribs 10 in the vicinity of the riser 16a are thus shorter than the ribs on the periphery of the riser 16a.

In addition, as shown in FIG. 14, on the cathode side of the interconnect 9, the ribs 10 do not extend into the flat surface 32 that is proximate the riser channel 16a. Because the ribs 10 on both sides of the interconnect 9 are shorter in the area of the plenum 17a and riser channel 16a, the interconnect 9 has a relatively smaller thickness, and thus a high density, in area of the plenum 17a and riser channel 16a, which results in a stronger interconnect in these critical failure areas.

In certain embodiments, such as shown in FIG. 14, the ribs 10 on the cathode side of the interconnect 9 may be shorter than the ribs 10 on the anode side of the interconnect 9. On the cathode side, a groove 35 is formed between the edge of the flat surface 32 and the ends of the ribs 10. The groove 35 may extend at least around the area of the flat surface 32, i.e., where the donut seal 15a shown in FIG. 8A will be later deposited. The groove 35 may be formed in an area where there are ribs 10 on the anode side of the interconnect 9 but no ribs on the cathode side of the interconnect 9. The groove 35 provides an additional area of reduced thickness of the interconnect 9 proximate the plenum 17a and riser channel 16a, which results in higher density and additional mechanical strength and stability in this area.

In addition, as shown in FIG. 15, the ribs 10 on the anode and cathode sides of the interconnect 9 can be offset relative to one another, which helps to maintain a relatively uniform thickness in the interconnect As shown in FIG. 15, for example, the interconnect 9 can have a substantially uniform thickness (e.g., $T_2$) over the region containing the ribs 10. The interconnect 9 can have a smaller thickness (e.g., $T_3$) in the vicinity of the plenum 17a and riser channel 16a, which results in a higher density and increased strength in this critical failure area.

Embodiments can also include chamfers 33 around the fuel riser opening 16a to provide even higher-densities around the riser holes, as shown in FIGS. 12-15. The chamfers 33 provide a lower thickness region (e.g., $T_1$) around the riser opening 16a than in surrounding areas (e.g., $T_2$ or $T_3$). The chamfer 33 can be provided on the anode- and/or the cathode-side(s) of the interconnect 9.

The interconnect 9 shown in FIGS. 12-15 is generally characterized by lower thickness(es) to provide higher density and high strength, and also includes shallower features to reduce powder movement during the powder compacting step.

In some embodiments, the interconnect 9 can be formed using a custom powder placement in a die cavity of a pressing apparatus, in which less powder is placed in the area of the die cavity corresponding to the plenum 17a than in other areas of the die cavity.

In some embodiments, an interconnect for a fuel cell can be formed using a high-speed single-press technique. A single press method can include pressing the metal powder at extremely high speeds, including explosive or near-explosive speeds. The powder may be a clean unoxidized surface with no lubricant in it. The powder can be a pre-alloyed Cr—Fe powder, described above. Using a high-speed single press process, an interconnect can be formed in less than 3 seconds, such as 0.5 to 2.5 seconds, and typically between 1-2 seconds, compared to 3-4 seconds using conventional powder pressing techniques. In certain embodiments, an interconnect formed via a high-speed single-press process may require no sintering or oxidation due the high-speed of the press and high-density of the pressed powders. A combustion-driven powder compaction apparatus which can be used in a high-speed, single press powder press process is commercially available from UTRON Kinetics, LLC of Manassas, Va.

In various embodiments, the high speed, single press powder compression (compaction) method can take place in two stages. A first compaction stage can take about one to two seconds to achieve ~90% of the total compaction, and then the second state can take 0.1 to 100 milliseconds, and typically about 10 milliseconds, for the remaining ~10% of the compaction. The first stage may be performed with a gas fill of the cylinder of the pressing apparatus to push the powder down to greater than 80% of the final compaction state, generally between 85-95% of the final compaction state, such as 90% of the final compaction state. The remaining compaction, which is typically less than 20% of the total compaction, generally between 5-15% and typically around 10% of the total compaction, can be driven by a rapid combustion (explosion) of the gas fill of the cylinder of the pressing apparatus to raise the compaction force higher, and allow shock waves to break the powder into smaller pieces and fill the pores. This is known in the field as "high velocity compaction." Generally, a high velocity compaction process is sufficient to provide a single-press, net shape or near net shape interconnect according to various embodiments. Although it will be understood that even higher velocity compaction methods, such as explosive compaction, which is fast enough to have the particle interfaces melt due to frictional heating, could also be used.

In various embodiments, an interconnect formed using high-velocity compaction as described above can have a relatively high density, and therefore low gas permeability, which may eliminate the need to subject the interconnect to an oxidation treatment, such as described above, prior to installation of the interconnect into a fuel cell stack. The interconnect formed by high-velocity compaction can have very low gas permeability to prevent hydrogen and other gases from penetrating the interconnect.

Further embodiment methods of fabricating an interconnect using high-velocity compaction include providing a pre-sintered chromium/iron powder mixture, and compressing (compacting) the pre-sintered powder mixture using a high-velocity compaction apparatus to form the interconnect. By using pre-sintered powders, sintering the compacted interconnect for diffusion purposes may not be needed. In some embodiments, such as when the metal powder stock is sufficiently "clean" (i.e., free of oxides), the high-velocity compaction can make the interconnect strong enough so that no sintering at all is needed. Thus, in these methods, the interconnect is not sintered (i.e., not subjected to a temperature required for sintering) between the steps of pressing and being provided into a fuel cell stack (and preferably between the steps of pressing and operating the fuel cell stack to generate electricity). If desired, a pre-sintering step can be added before the pressing step or the pre-sintering step can also be omitted, such that the interconnect is not sintered between the steps of providing the starting powder for the eventual pressing step and providing the interconnect into a fuel cell stack.

Further embodiment methods of fabricating an interconnect using high-velocity compaction include providing a chromium/iron powder mixture and a coating material over at least one surface of the chromium/iron powder mixture, and compressing (compacting) the chromium/iron powder mixture and the coating material using a high-velocity compaction process to form an interconnect having a coating over at least one surface. The coating material can be a powder. It is known to provide a coating to a surface of an interconnect, such as on the air (cathode) side of the interconnect, in order to decrease the growth rate of a chromium oxide surface layer on the interconnect and to suppress evaporation of chromium vapor species which can poison the fuel cell cathode. Typically, the coating layer, which can comprise a perovskite such as lanthanum strontium manganite (LSM), is formed using a spray coating or dip coating process. Alternatively, other metal oxide coatings, such as a spinel, such as an (Mn, Co)$_3$O$_4$ spinel) can be used instead of or in addition to LSM. Any spinel having the composition Mn$_{2-x}$Co$_{1+x}$O$_4$ (0≤x≤1) or written as z(Mn$_3$O$_4$)+(1−z)(Co$_3$O$_4$), where (⅓≤z≤⅔) or written as (Mn, Co)$_3$O$_4$ may be used. In various embodiments, the coating material (e.g., LSM or another metal oxide coating material, or a spinel, such as an (Mn, Co)$_3$O$_4$ spinel) can be provided in powder form in the die cavity with the chromium/iron powder, and is preferably provided in the area of the die cavity corresponding to the air (cathode) side surface of the interconnect (e.g., above or below the chromium/iron powder in the die cavity). The powder is then compressed (compacted) at high-velocity to form an interconnect having a coating layer over the air (cathode) side surface of the interconnect. This can allow elimination of the LSM coating process for the air side, cutting the cost substantially. It can also be used to provide much higher density coatings, which can further reduce leakage of chromium through the coating.

While solid oxide fuel cell interconnects, end plates, and electrolytes were described above in various embodiments, embodiments can include any other fuel cell interconnects, such as molten carbonate or PEM fuel cell interconnects, or any other metal alloy or compacted metal powder or ceramic objects not associated with fuel cell systems.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of fabricating an interconnect for a fuel cell stack, comprising:
    placing a compressed metal powder interconnect on a porous support;
    sintering the compressed metal powder interconnect in the presence of a non-oxidizing gas;
    placing the sintered interconnect on a dense, non-porous support; and
    oxidizing the sintered interconnect in an environment that is substantially nitrogen-free to fill pores throughout the thickness of the sintered interconnect prior to using the oxidized interconnect to separate fuel and oxidant gas flows in a solid oxide fuel cell stack.

2. The method of claim 1, wherein the interconnect comprises chromium and iron having an iron content of greater than 3% by weight.

3. The method of claim 1, wherein the porous support comprises at least one of a porous ceramic mesh or grid.

4. The method of claim 1, wherein the non-oxidizing gas comprises at least one of hydrogen and forming gas.

5. A method of fabricating an interconnect for a fuel cell stack, comprising:
    placing a compressed metal powder interconnect on a porous support;
    sintering the compressed metal powder interconnect in the presence of a non-oxidizing gas, wherein sintering the compressed metal powder interconnect comprises at least one of partially sintering and fully sintering the compressed metal powder interconnect;
    providing the partially sintered or fully sintered interconnect on a porous support in flowing air; and
    oxidizing the sintered interconnect such that the flowing air permeates into the sintered interconnect through the porous support to purge out nitrogen and form oxides to fill pores throughout the thickness of the sintered interconnect prior to using the sintered interconnect to separate fuel and oxidant gas flows in a solid oxide fuel cell stack.

6. The method of claim 1, wherein sintering the compressed metal powder interconnect comprises at least one of partially sintering and fully sintering the compressed metal powder interconnect, and oxidizing the sintered interconnect further comprises:
    oxidizing the sintered interconnect in a gas comprising pure oxygen and that is substantially nitrogen-free.

7. The method of claim 1, wherein sintering the interconnect comprises at least one of partially sintering and fully sintering the compressed metal powder interconnect, and oxidizing the sintered interconnect further comprises:
    oxidizing the sintered interconnect in a gas comprising an oxygen/inert gas mixture that is substantially nitrogen-free.

8. The method of claim 1, wherein the interconnect comprises chromium and iron having an iron content of greater than 7% by weight, and wherein sintering the compressed metal powder interconnect comprises:
    partially-sintering the compressed metal powder interconnect at an elevated temperature of at least about 1100° C.; and
    stopping the sintering before the compressed metal powder interconnect is fully sintered and while the compressed metal powder interconnect has a coefficient of thermal expansion that is within 5% of the coefficient of thermal expansion (CTE) of an electrolyte material for a solid oxide fuel cell.

9. The method of claim 1, further comprising:
    pressing a metal powder in a single pressing step to near net shape or to net shape to form the compressed metal powder interconnect.

10. The method of claim 1, wherein the compressed metal powder interconnect is sintered at a temperature between approximately 1100° C. and 1520° C.

11. The method of claim 10, wherein the compressed metal powder interconnect is sintered at a temperature between approximately 1250° C. and 1350° C.

12. The method of claim 1, further comprising:
    placing a metal powder containing chromium in a vacuum at an elevated temperature of at least about 1200° C. for a period sufficient to remove gas impurities; and
    pressing the metal powder to provide the compressed metal powder interconnect.

13. The method of claim 12, wherein the powder is placed in the vacuum at a temperature between about 1200° C. and 1600° C. for a period of between about 2 and 3 days.

14. The method of claim 13, wherein the powder is placed in the vacuum atmosphere at a temperature of about 1400° C. for a period of about 2.5 days.

15. A method of fabricating an interconnect for a fuel cell stack, comprising:
    removing alumina from a chromium metal powder;
    adding aluminum to the chromium metal powder;
    pressing the chromium metal powder with the aluminum powder to provide a compressed metal powder interconnect;
    placing the compressed metal powder interconnect on a porous support;
    sintering the compressed metal powder interconnect in the presence of a non-oxidizing gas; and
    following the sintering, oxidizing the sintered interconnect to convert at least a portion of the aluminum to alumina.

16. The method of claim 15, wherein the adding aluminum comprises adding approximately 200-500 ppm of aluminum.

17. The method of claim 15, wherein the oxidizing further comprises:
    oxidizing the sintered interconnect in the presence of air on the porous support.

18. The method of claim 15, wherein the oxidizing further comprises:
   placing the sintered interconnect on a dense, non-porous support; and
   oxidizing the sintered interconnect in the presence of a gas comprising pure oxygen that is substantially nitrogen-free.

19. The method of claim 15, wherein the oxidizing further comprises:
   placing then sintered interconnect on a dense, non-porous support; and
   oxidizing the sintered interconnect in the presence of a gas comprising an oxygen/inert gas mixture that is substantially nitrogen-free.

20. The method of claim 1, further comprising incorporating the interconnect into the solid oxide fuel cell stack such that when fuel and oxidant are provided to opposite fuel and oxidant sides of the interconnect in the solid oxide fuel cell stack, the interconnect separates the fuel and the oxidant gas flows and prevents air or another oxidant gas from reaching an anode electrode of a fuel cell located in contact with the fuel side of the interconnect.

* * * * *